United States Patent [19]

Fröhlich

[11] 3,967,813

[45] July 6, 1976

[54] BUTTERFLY FLAP VALVE

[76] Inventor: Karl Heinrich Fröhlich, Bergstrasse 47, D-6672 Rohrbach, Saar, Germany

[22] Filed: Nov. 25, 1974

[21] Appl. No.: 527,057

[30] Foreign Application Priority Data
Dec. 18, 1973   Germany............................ 2362966

[52] U.S. Cl. ............................................... 251/298
[51] Int. Cl.² ........................................... F16K 1/16
[58] Field of Search ........................... 251/298, 158

[56] References Cited
UNITED STATES PATENTS

| | | | |
|---|---|---|---|
| 2,710,737 | 6/1955 | Schaupp | 251/298 X |
| 3,023,774 | 3/1962 | Schuller | 251/298 X |
| 3,428,064 | 2/1969 | Phillips | 251/158 X |
| 3,658,293 | 4/1972 | Gaebel | 251/298 X |
| 3,804,124 | 4/1974 | Finke | 251/298 X |
| 3,847,373 | 11/1974 | Hagar | 251/298 |

FOREIGN PATENTS OR APPLICATIONS 1,008,000   10/1965   United Kingdom................. 251/298

*Primary Examiner*—Harold W. Wealsley
*Attorney, Agent, or Firm*—Andrus, Sceales, Starke & Sawall

[57] ABSTRACT

The specification describes a butterfly flap valve comprising a flap which on opening is adapted firstly to be axially displaced and then turned. For operating the flap a shaft extends transversely to the direction of flow into the housing of the valve and carries fixed on it an arm lever which is pivotally connected with the flap. In a plane spaced from the plane of the lever the flap is connected with a link which is pivotally connected with the housing. The link and the lever form an articulated quadrilateral which is staggered so as to lie in two planes.

3 Claims, 3 Drawing Figures

BUTTERFLY FLAP VALVE

BACKGROUND OF THE INVENTION

1. Field of the Invention

The invention relates to a butterfly flap valve comprising a butterfly flap which for opening is adapted firstly to be axially displaced and then turned.

2. Description of Prior Art

A butterfly flap valve of the foregoing type, in which the shaft is journalled outside the flow cross-section is described in the U.S. Pat. No. 3,669,405.

Although this flap valve already has substantial advantages over previously known valves, it still has a few disadvantages. Owing to the long lever arm a high turning torque results. In the case of unfavourable manufacturing tolerances jamming of the links may result. Furthermore, a substantial number of pivoting joints is present in the medium to be controlled by the valve and these pivot points usually operate at temperatures substantially above room temperature and there is no possibility of lubricating them. Finally, owing to the three-point carrying arrangement also the flap valve is not carried or journalled in a statically defined manner.

It has been proposed to provide a further development of the flap valve in accordance with the U.S. Pat. No. 3,669,405 in which development the shaft runs within the flow cross-section in order to shorten the lever arm. However this construction still requires improvement, because the fabrication of the carrying arms arranged inside is complex and furthermore a large number of pivot or bearing points must be provided. Further, the bearing of the lever can practically only be made in two parts and comparatively high pressure losses are to be expected in he medium flowing through the valve owing to the interfering cross-sections of the parts extending into the flow.

SUMMARY OF INVENTION

One aim of the present invention is to deal with the defects mentioned found in the earlier constructions and, however, simultaneously to keep the advantages of these constructions.

In order to achieve these and other aims the invention consists in a butterfly flap valve comprising a butterfly flap which for opening is adapted firstly to be axially displaced and then turned, and which is to be operated by a shaft, running across and through the fluid flow in the valve. The shaft is journalled in a valve housing and is connected with the butterfly flap by a single lever which is connected pivotally centrally with the flap by means of a pin running parallel to the shaft. The flap is adapted to be guided in its course of movement by a single link which is mounted adjacent to the lever, is pivotally connected at one end with the butterfly flap and at its other end is pivotally connected with the housing. The lever and link are pivotally connected with the flap in a flying or floating manner centrally on the flap.

Owing to this construction it is possibly to reduce the number of bearings necessary to half those required with previous forms of construction and furthermore simpler assembly is made possible.

The flap can be journalled using a fin or rib which is attached immediately adjacent to the lever hub and extends into the flow space. The second bearing or bearing point is located on the housing wall adjacent to the shaft passage on the outside so that bearing means for the shaft can be provided which are statically defined or definite. The bending forces occurring remain however small.

A further advantage of the construction in accordance with the invention resides in that, on the basis of a correct positioning of the butterfly flap in the closed position, as is normally guaranteed by careful assembly, errors in the manufacturing tolerances and/or thermal expansion owing to temperature changes do not lead to a jamming of the system, comprising the lever and the link and furthermore owing to the construction with only one lever and only one link the manufacturing tolerance and/or thermal expansion only lead to an oblique setting of the flap in the partly opened or in the opened condition, something which however does then not impair the function of the butterfly flap valve in any way.

Since thermal expansions can practically not be avoided in the case of butterfly flap valves, used for shutting off or controlling hot gases, and furthermore they are also transmitted to the drive of the shaft, in accordance with a further embodiment of the invention the shaft is provided wth a setting ring which is mounted within the flow cross-section immediately adjacent to the housing and this ring limits the movement of the shaft outwards. A movement of the shaft in an inward direction admittedly leads at a position adjacent to the lever to a parallel displacement of the system, comprising the lever, the link, and the flap along the axis of actuation, but it does not however lead to an impairment of the function of the butterfly flap valve in the case of the usual construction with plane-parallel sealing surfaces.

BRIEF DESCRIPTION OF THE DRAWINGS

The accompanying drawings show an embodiment of a butterfly flap valve in accordance with the invention.

DESCRIPTION OF PREFERRED EMBODIMENT

Figure 1:
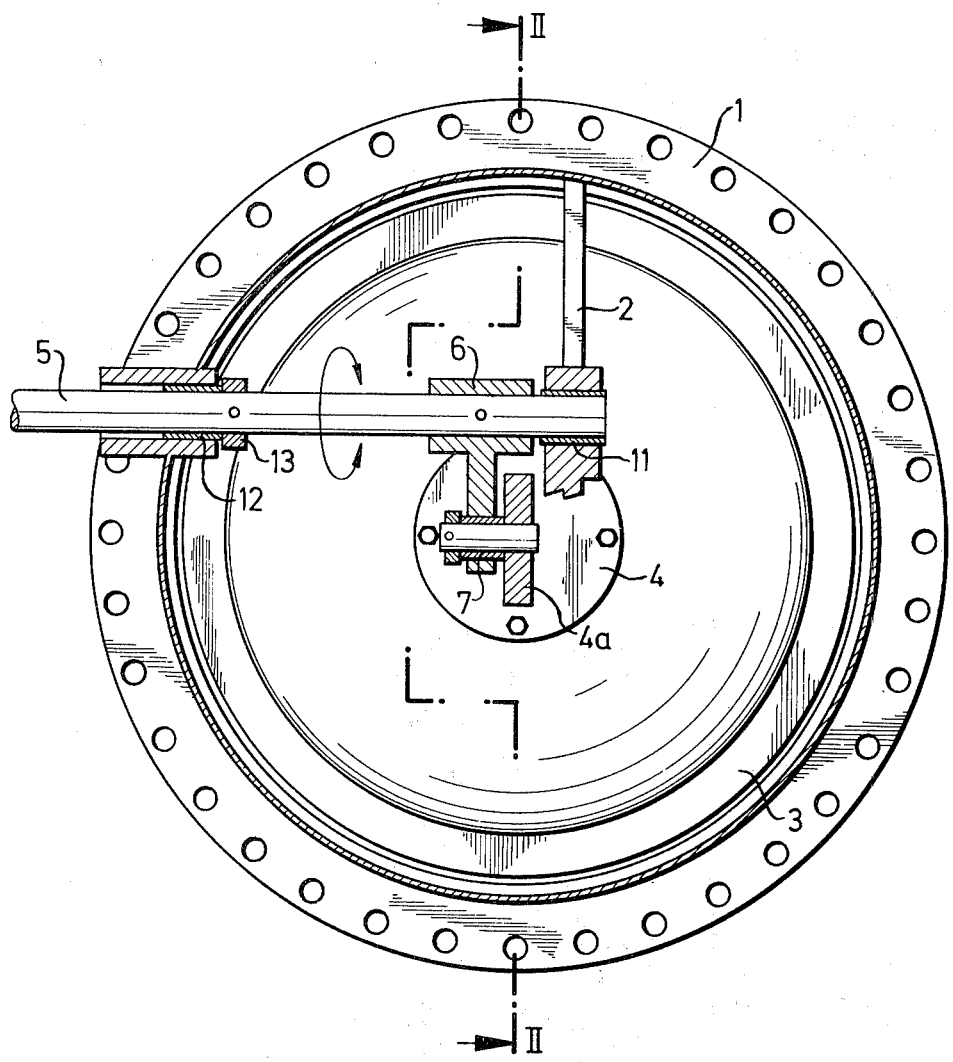
FIG. 1 shows in section a view of the flap valve on the line I–II of FIG. 2.
Figure 1A:
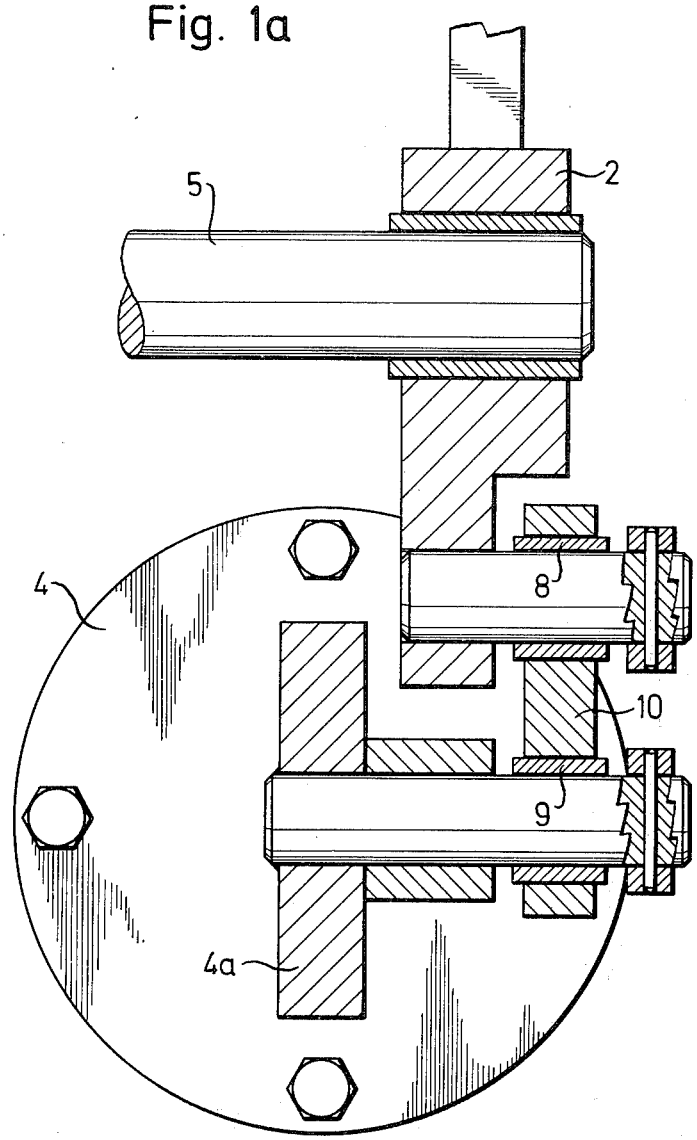
FIG. 1a shows a detail on the line I–III of FIG. 1 partly in section and with the arm 6 and the pin at its lower end omitted.
Figure 2:
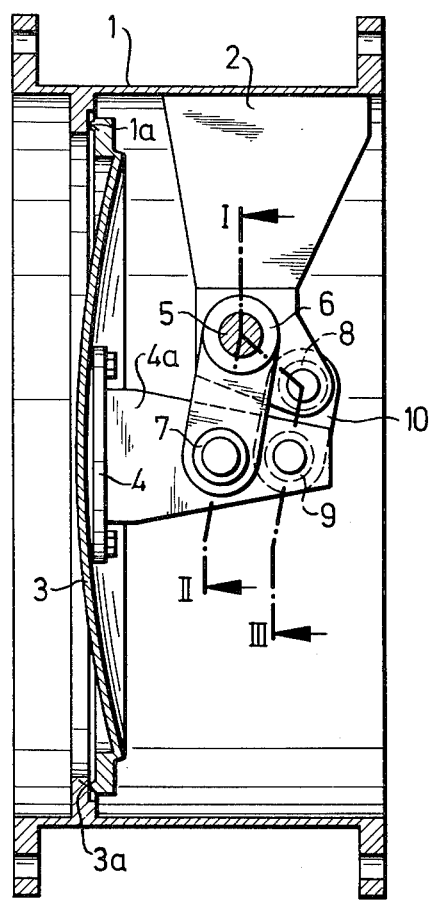
FIG. 2 shows a vertical section on the line II—II of the flap valve in accordance with FIG. 1.

In the figures reference numeral 1 denotes the valve housing, which at its ends carries flanges, which are connected to the tube parts of a pipeline, whose flow cross-section is to be opened or closed by the butterfly flap valve.

In the housing there is the housing sealing surface 1a, against which the butterfly flap 3 abuts with the flap sealing surface 3a in the closed condition of the butterfly flap valve. The flap 3 is carried by means of the shaft 5, which on the one hand is journalled in a shaft bearing 11 in the fin 2 and on the other hand in a shaft bearing 12 in the housing. The shaft 5 is located adjacent a center piece 4 with the flap 3. On the center piece 4 there is a projection 4a, which carries the bearing 7 for a short arm lever 6, which is fixed on the shaft 5. Furthermore, on the projection 4a there is a link bearing 9, on which a short link 10 is borne and this link is connected at its other end via a link bearing 8 with the fin or rib 2 of the housing.

A setting ring 13 on the shaft 5 serves for limiting an outward movement of the shaft when expansion takes place owing to the influence of heat. Various modes of carrying out the invention are contemplated as being within the scope of the following claims particularly pointing out and distinctly claiming the subject matter which is regarded as the invention.

I claim:

1. A butterfly flap valve comprising:

a housing containing a sealing surface and suitable for fluid flow along an axis;

a generally circular butterfly flap having a central flow blocking portion and a periphery mateable with said sealing surface for closing said valve and adapated to be firstly axially displaced from said sealing surface and thereafter turned to lie generally parallel to the axis of fluid flow to open said valve, said flap having a projection extending from the central portion thereof parallel to the axis of fluid flow when said flap is in the closed position;

a first journal located in said housing for journalling a shaft extending across the flow of fluid within said housing and adjacent said projection of said flap, a support means in said housing extending toward said projection when said flap is in the closed position and containing a second journal for receiving the end of said shaft within said housing;

a single lever arm mounted on said shaft and pivotally connected to said projection of said butterfly flap for moving said flap upon rotation of said shaft, said lever arm having a length which is small compared to the diameter of said flap; and a single link pivotally connected to said projection at a location which is axially spaced from the connection of said lever in a direction away from said flap and connected to said support means adjacent said lever arm for guiding the movement of said butterfly flap during opening, said link having a length which is small compared to the diameter of said flap, said lever arm and said link being positioned so as to form an articulated quadrilateral when said flap is closed.

2. A valve in accordance with claim 1 in which said single link and said single lever arm are arranged to pivot in spaced planes perpendicular to said shaft, and wherein said single lever arm and said single link are located on opposite sides of said projection.

3. A valve in accordance with claim 1 further including means surrounding said shaft within and adjacent to said housing for limiting movement of said shaft in an outward direction through said first journal responsive to temperature changes.

* * * * *